US012701507B2

(12) United States Patent
Hegde et al.

(10) Patent No.: US 12,701,507 B2
(45) Date of Patent: Aug. 4, 2026

(54) SYSTEM, DEVICES AND METHODS FOR EFFICIENTLY ESTIMATING WIRELESS MODEM POWER CONSUMPTION

(71) Applicant: Intel Corporation, Santa Clara, CA (US)

(72) Inventors: Mythili Hegde, Bangalore (IN); David Graham, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/327,912

(22) Filed: Jun. 2, 2023

(65) Prior Publication Data

US 2024/0023014 A1     Jan. 18, 2024

(30) Foreign Application Priority Data

Jul. 15, 2022    (IN) ............................. 202241040537

(51) Int. Cl.
H04W 52/02          (2009.01)

(52) U.S. Cl.
CPC .............................. H04W 52/0206 (2013.01)

(58) Field of Classification Search
CPC ................................................. H04W 52/0206
USPC .......................................... 375/212, 295–297
See application file for complete search history.

(56) References Cited

U.S. PATENT DOCUMENTS

| | | | | |
|---|---|---|---|---|
| 2007/0297044 A1* | 12/2007 | Qiao | ................... | H01S 3/06758 |
| | | | | 359/337 |
| 2011/0022356 A1* | 1/2011 | Nussbaum | .......... | G06F 11/3433 |
| | | | | 702/182 |
| 2015/0277521 A1* | 10/2015 | Jain | ........................ | G06F 1/3225 |
| | | | | 713/300 |
| 2016/0170465 A1* | 6/2016 | Flynn | .................... | G06F 1/3234 |
| | | | | 713/320 |
| 2016/0179164 A1* | 6/2016 | Park | ...................... | G06F 1/3206 |
| | | | | 713/340 |
| 2017/0102757 A1* | 4/2017 | Kang | ................... | H04L 41/0894 |
| 2018/0307295 A1* | 10/2018 | Tameem | ............. | G06F 13/1678 |
| 2021/0258890 A1* | 8/2021 | Takeda | ................ | H04W 52/346 |
| 2023/0199672 A1* | 6/2023 | Takeda | ................ | H04W 52/281 |
| | | | | 455/323 |
| 2023/0292236 A1* | 9/2023 | Jiang | ...................... | H04B 7/088 |

* cited by examiner

*Primary Examiner* — Emmanuel Bayard
(74) *Attorney, Agent, or Firm* — Viering, Jentschura & Partner mbB

(57) ABSTRACT

The disclosure herein relates to systems, methods, and devices for estimating a total estimated power consumption of a wireless modem. The power estimation may include determining a static power consumption estimate based on configuration parameters of modem subcomponents of a wireless modem. The power estimation may also include determining a dynamic power consumption estimate based on a sum of, for each corresponding active power amplifier of the wireless modem, a predefined power offset associated with a current reported power level for the corresponding active power amplifier and a maximum transmit power of a predefined range associated with the current reported power level of the active power amplifier. The power estimation may also include combining the static power consumption estimate and the dynamic power consumption estimate as the total estimated power consumption of the wireless modem.

19 Claims, 4 Drawing Sheets

300

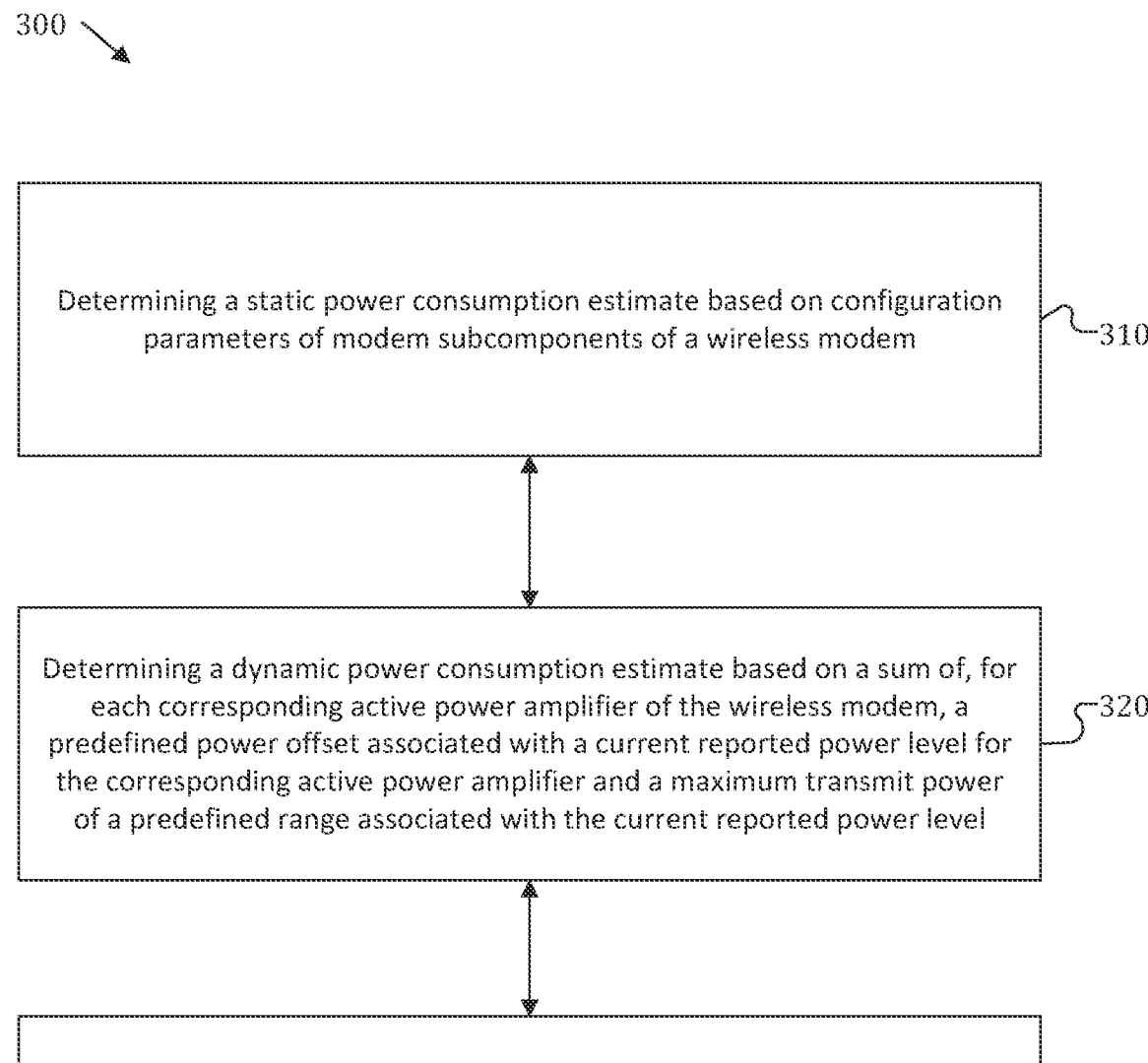

Determining a static power consumption estimate based on configuration parameters of modem subcomponents of a wireless modem ⟍310

Determining a dynamic power consumption estimate based on a sum of, for each corresponding active power amplifier of the wireless modem, a predefined power offset associated with a current reported power level for the corresponding active power amplifier and a maximum transmit power of a predefined range associated with the current reported power level ⟍320

Combining the static power consumption estimate and the dynamic power consumption estimate as a total estimate of the power consumption of the wireless modem ⟍330 allocate a power budget to the modem based on the total estimate of the power consumption ⟍340

FIG. 3

SYSTEM, DEVICES AND METHODS FOR EFFICIENTLY ESTIMATING WIRELESS MODEM POWER CONSUMPTION

CROSS-REFERENCED APPLICATIONS

This non-provisional application claims priority to Indian Patent Application No. 202241040537, which was filed on Jul. 15, 2022, and which is incorporated by reference herein in its entirety.

TECHNICAL FIELD

The disclosure relates to wireless devices (e.g., wireless wide area network modems), and in particular to estimating the power consumption of such devices.

BACKGROUND

Modern personal computers (PCs) such as laptops often contain multiple devices, each of which can consume significant power from the platform power delivery system (e.g., a video system, an input/output system, a memory/storage system, a communication system, etc). Many PCs, laptops, tablets, mobile phones, etc., often include, as part of the communication system, a wireless wide area network (WWAN) modem that provides wireless connectivity for the laptop. The power consumed by the WWAN modem may be quite dynamic, depending on how the WWAN is configured and the radio frequency (RF) signal conditions in the environment in which it is used. If the platform power delivery system does not have an accurate estimation of the WWAN power consumption over time, the platform power delivery system may not be able to efficiently coordinate power delivery to each device supported by the platform.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which:

FIG. 3 shows a schematic flow diagram of an exemplary method for estimating power consumption of a wireless modem.

DESCRIPTION

Figure 1:
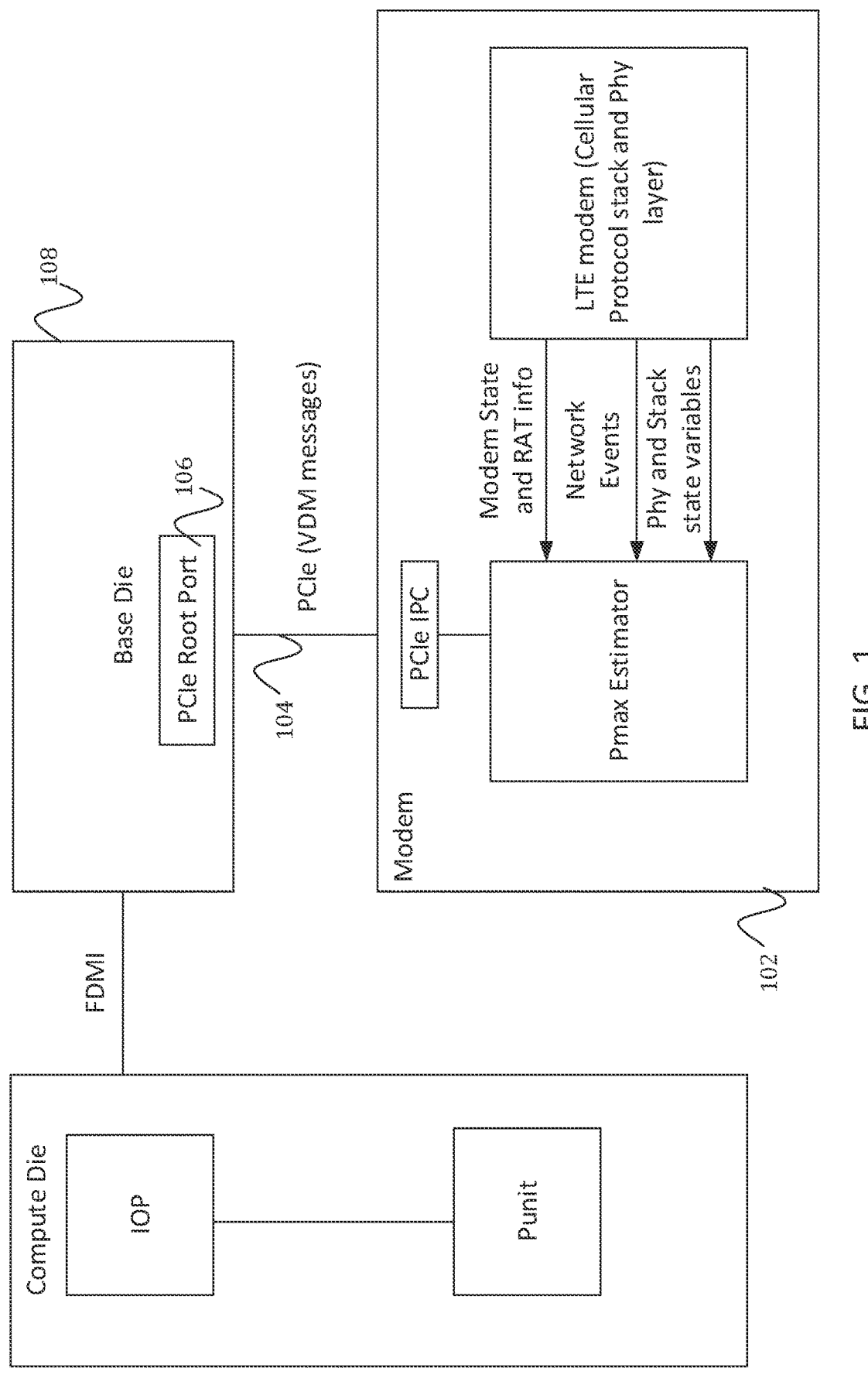
FIG. 1 shows an exemplary circuit diagram of a wireless wide area network modem that may communicate with a system-on-chip regarding power consumption.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individually listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains fewer elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.1 lay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license-exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (allocated, for example, in the US (FCC Part 15)), 863-868.6 MHz (allocated, for example, in the European Union (ETSI EN 300 220)), 915.9-929.7 MHz (allocated, for example, in Japan), 917-923.5 MHz (allocated, for example, in South Korea), 755-779 MHz and 779-787 MHz (allocated, for example, in China), 790-960 MHz, 1710-2025 MHz, 2110-2200 MHz, 2300-2400 MHz, 2.4-2.4835 GHz (e.g., ISM band with global availability, used by Wi-Fi 11b/g/n/ax and by Bluetooth), 2500-2690 MHz, 698-790 MHz, 610-790 MHz, 3400-3600 MHz, 3400-3800 MHz, 3800-4200 MHz, 3.55-3.7 GHz (allocated, for example, in the US for Citizen Broadband Radio Service), 5.15-5.25 GHz and 5.25-5.35 GHz and 5.47-5.725 GHz and 5.725-5.85 GHz bands (allocated, for example, in the US (FCC part 15), including four U-NII bands, for a total of 500 MHz of spectrum), 5.725-5.875 GHz (allocated, for example, in the EU (ETSI EN 301 893)), 5.47-5.65 GHz (allocated, for example, in South Korea, 5925-7125 MHz and 5925-6425 MHz band (under consideration in the US and the EU, respectively). Next generation Wi-Fi systems are expected to include operating bands the 6 GHz spectrum, IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63 64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (in the US FCC part 15 allocates a total of 14 GHz of spectrum, while the EU, ETSI EN 302 567 and ETSI EN 301 217-2 (for fixed P2P) allocates a total of 9 GHz of spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

The apparatuses and methods described herein may be implemented using a hierarchical architecture, e.g., by introducing a hierarchical prioritization of usage for different types of users (e.g., low/medium/high priority, etc.), based on a prioritized access to the spectrum (e.g. with highest priority given to tier-1 users, followed by tier-2, then tier-3, etc.).

Some of the features in this document may be defined for the network side, such as Access Points, eNodeBs, New Radio (NR), or next-generation Node Bs (gNodeB or gNB—note that this term is typically used in the context of 3GPP fifth generation (5G) communication systems), etc. Still, a User Equipment (UE) may take this role as well and act as an Access Points, eNodeBs, gNodeBs, etc. In other words, some or all features defined for network equipment may be implemented by a UE.

In the context of modern laptop PCs that include a wireless wide area network (WWAN) modem, accurately estimating WWAN power consumption may be critical for the platform power delivery system, which usually supplies power to multiple devices beyond the WWAN, to properly coordinate power delivery to each supplied device. If the WWAN power consumption is over-estimated, the power delivery system may over-allocate power to the WWAN, causing performance issues. In conventional systems, WWAN power consumption may be estimated using (1) a look-up table (LUT) for WWAN power consumption based on operating mode; or (2) a "real-time" estimation based on operating mode and signal conditions. Each may have disadvantages.

For example, the LUT approach may not accurately account for dynamic radio frequency (RF) power component of WWAN power consumption. RF power changes quite dynamically in a live network call, and the WWAN power consumption is highly dependent on transmitter RF power being generated. The LUT may need to account for the maximum TX signal power, in which case the power estimation will be excessively over-estimated. Or the LUT power estimate might be too low, in which case the WWAN power can exceed the estimate based only on configuration. The look-up tables can also become quite large based on the multiplicity of band combinations, channel configurations (e.g., bandwidth (BW)), modulation schemes, etc.) multiple-input-multiple-output (MIMO) configurations, etc. A look-up table covering all of these scenarios can become quite large and unwieldy.

In a "real-time" approach, the estimation usually involves trying to estimate the power based on the transmit (TX) radio frequency (RF) signal power changes. The TX RF signal power is controlled by signaling from the base-station (e.g., fixed-end-network), and may result in large swings in signal power over short periods of time (e.g., more than 10 dB change in RF signal level in a few milliseconds or less). Trying to provide a real-time estimate of the power consumption may cause excess system overhead, consume more power, and cause excessive load on the interface between the modem and host.

By contrast, the disclosed power estimation system discussed below involves combining the power estimation of two components: a "static" component and a "dynamic" component. The static component may consist of a parametric model that estimates power consumption of the WWAN ingredient based on configuration parameters (e.g., number of component carriers, number of component carrier bandwidths, number of MIMO layers, etc.) and may consist of an equation and simple look-up tables. The dynamic component may consist of a segmented look-up table that is indexed by RF signal power at the time of the estimation. This form of power estimation may allow for taking into account all components that may impact the modem's overall power and network configuration at a given time. As a result, the disclosed power estimation may provide a reasonably accurate estimation of WWAN power consumption that may not require excessive look-up tables or excessive traffic in the interface between modem and host. The solution may also allow better balancing of platform power delivery in systems deploying WWAN modem solutions in real-time.

As WWAN modems continue to advance from generation to generation, their platform peak power requirements have been growing, driven primarily by the continuing trend of increased compute requirements (e.g. graphics (e.g., GFX), core count) and input/output (e.g. TBT, memory BW) capabilities. At the same time, power delivery capabilities have remained largely the same or have grown very slowly, effectively limiting or reducing the amount of peak power ($P_{max}$) available to the system-on-chip (SoC) (also referred to as application processor or AP).

Reducing the SoC peak power budget may significantly constrain its operating frequency. Because SoC power is highly dependent on system workload, it may peak unpredictably and nearly instantaneously. To ensure SoC power never exceeds its peak power budget allocation, the SoC operating frequency may need to be proactively controlled and/or limited to ensure that any worst-case power spike does not violate the $P_{max}$ limit. Platform peak power budget may be allocated among many different components including display, cameras, modem and connectivity, memory and storage, and finally the SoC itself. Each component may have a different $P_{max}$ power level and may peak independently over very short time scales (e.g., microseconds). Even though it is statistically very unlikely that all system components will peak at the same time, especially in realistic usage scenarios, given that component peak power is often not controlled, many existing systems may take an overly conservative approach and calculate system $P_{max}$ as the sum of all components' worst case peak power. While this approach may provide full protection, it may also come with a significant loss in system performance.

With respect to the WWAN, cellular modem power consumption may peak frequently, over very short time scales, and, in particular, in an unpredictable fashion from the platform perspective because the base station (e.g., eNB) scheduler controls when the modem (e.g., LTE modem) enters peak power consumption states (e.g., in LTE radio resource control (RRC)-connected mode, with, for example, maximum throughput (t-put) downlink allocations or uplink grants at maximum transmit (TX) power level. As a result, the peak power budget allocated to the modem in conventional systems is usually based on a very conservative corner case for use of the modem (e.g. sustained theoretical peak throughput at maximum transmit power level) and on worst-case operating and environmental conditions (e.g. ambient temperatures).

Unlike these conventional systems, the disclosed power estimation system may include the following features: (1) The modem may support a runtime peak power consumption estimator function in the modem which dynamically determines upcoming modem peak power consumption events by observing various modem parameters like a number of component carriers, throughput, radio resource control (RRC) state, TX power level to determine peak power requirements for at least few tens of milliseconds. (2) The modem $P_{max}$ estimator may map the upcoming event to a pre-defined modem peak power state and may notify the p-code in the processor (CPU) which manages power offset about the upcoming modem peak power demand via the Peripheral Component Interconnect Express (PCIe) root port in the base die and through an interface (e.g., via FDMI to the IOP) and through sideband mechanism to the p-unit in the compute die. (3) The modem may indicate the modem peak power requirements using, for example, PCIe vendor-defined messaging (VDM) via the PCIe bus to the PCIe root port in the physical channel (PCH) which may forward it to the p-code in the CPU. (4) When the p-code in the CPU receives a new modem offset value via PCIe VDM messages, the processor may update its system level, reclaiming peak power budget that is not currently used by the modem. An example of such a system is shown in FIG. 1.

The modem 102 may dynamically report peak power reporting (PPR) to the SoC to lower the rest of the platform $P_{max}$. The modem 102 may compute the peak power requirement based on RRC connection establishment, radio access technology (RAT), number of component carriers that are active, throughput, and/or TX RF power control using power headroom threshold. The modem 102 may communicate the peak power requirements using PCIe in-band VDM messaging 104 to avoid sideband interface between the modem 102 and SoC. The PCIe root port 106 in PCH may support route by ID VDMs, routes to IOSF upstream to DMI in PCH, and may forward across DMI to the CPU. The CPU does the next step of activities that may be required for system power management. As discussed in more detail below, modem peak power may depend on the network configuration and power consumption by different hardware components on the modem/module and the leakage current. The discussion below provides an exemplary algorithm and methodology for calculating the peak power consumed by the module, based on the dynamic network configurations.

A typical WWAN module includes numerous hardware components that consume power: a baseband chip, different transceivers, RF integrated circuit (RFIC), power management integrated circuit (PMIC), and/or different power amplifiers (PAs). Each of these components may contribute to the total power consumption for any given modem use cases. An exemplary M.2 WWAN solution is discussed that includes a base band modem, a dynamic random access memory (DRAM), an RFIC, a PMIC, LTE PAs, 5th Generation (5G) New Radio (NR) PAs, and other amplifiers/transceivers (e.g., a low noise amplifier LNA). In some embodiments, the exemplary M.2 WWAN solution may further include RF modules with arrays of mmW PAs and LNAs for operation in millimeter wave bands that utilize the same power distribution network of the host device.

An improved methodology for peak power estimation for a given real-time use case may include the following aspects, where the overall goal of the method may be to generate a sufficiently accurate estimate with a minimal level of complexity. The components that may be included in the peak power calculation and what impacts power consumption for each component are discussed below. For the baseband (BB) modem plus DRAM plus PMIC (e.g., SoC subsystem), the impacts may be the BB plus DRAM power consumption based on: (1) the number of component carriers (CCs) (e.g., more CC's in the uplink (UL) or downlink (DL) may mean that more digital circuits are active with higher interface data speed and/or that more lanes are active); (2) the bandwidth of component carriers (e.g., a higher bandwidth may imply that a higher clock rate is required); (3) the modulation order of component carriers (e.g., higher order modulation may imply a higher data rate which may imply that a higher interface speed is required and therefore more computations in the modem); and/or (4) MIMO configuration (e.g., higher order MIMO paths may result in more lanes in the digital and consume more current).

For the RFIC (e.g., transceiver), the impacts may be the transceiver power consumption based on: (1) the number of component carriers (e.g., more CC's in the uplink or downlink may mean that more analog circuits are active with higher interface data rates and/or that more lanes are active); (2) the bandwidth of CCs (higher bandwidth may imply higher clock rate in analog-to-digital and digital-to-analog converters and a higher clock rate in the digital front end); (3) MIMO configuration (e.g. a higher order MIMO may result in more signal paths being active).

For the PAs, the impacts may be the PA power consumption based on: (1) RF output power, which, incidentally may have the largest impact on PA power consumption (and as should be appreciated, some bands operate in a high power user equipment (HPUE) mode, so these PAs may have a greater power consumption); (2) bias point for each PA, which may differ from band to band, so the amount of power associated with full RF power in one PA may be different from the amount of power associated with full RF power in another PA operating in a different band; (3) the number of PAs that are active (e.g., power consumption for each PA may not change, but each PA will consume power such that they are additive); and (4) whether the PAs are operating in time-division duplex (TDD) or frequency division duplex (FDD) mode. As should be appreciated, the power consumption may also depend on bandwidth, RF signal, or modulation order, although these may not have much impact on the PA's power consumption.

Then, the total estimated power consumption for the modem may be the summation of the power consumption of each of these sub components. In other words: $P_{modem}=P_{baseband}$(#CC, bandwidth, modulation, MIMO layers)+$P_{RFIC}$ (#CC, bandwidth, MIMO layers)+$P_{PAs}$(#PAs, RF_Power). From a power model perspective, the $P_{baseband}$ and $P_{RFIC}$ may be primarily impacted by the number of component carriers (#CC), MIMO layers, and the bandwidth defined for each of these carriers. The number of component carriers and the bandwidth of each carrier may be defined when the call is configured and it may remain fixed until a new configuration is received. In other words, the configured values may remain static for the duration of a call configuration and may only change when the call is re-configured either by a change in the bandwidth, MIMO configuration, or a change in the number of component carriers.

The PA power may be a function of RF dynamics and may change considerably during the course of a call. The modulation order may also change within a call configuration, depending on system conditions. Both the RF uplink power and the UL/DL modulation order may be controlled by the fixed-end network, depending on current signal conditions. Modem power may not be considered to be a strong function of modulation order (e.g., a call that is using quadrature phase shift key (QPSK) modulation as compared to a call using 256 quadrature amplitude modulation (QAM) is not likely to vary significantly in terms of modem consumed power, assuming that all signal conditions and configurations are equal between the two calls).

With respect to $P_{baseband}$ and $P_{RFIC}$, the baseband SoC sub-system and the RFIC may have power consumption associated with TX path, power consumption associated with the RX path, and power associated with the control plane. The power model for each of these may be a function of these different components. For example, the RFIC power may be modeled with the following function:

$$P_{rfic} = \sum_{m=1}^{M} P_{RX} * \alpha_m * \delta_m + \sum_{n=1}^{N} P_{TX} * \beta_n + P_{cp} * \gamma$$

In the formula above, M is the number of DL component carriers, N is the number of UL component carriers, $P_{RX}$ is the RX power consumption of transceiver for narrowest bandwidth configuration for a single CC for the defined RAT (e.g., a baseline value), $P_{TX}$ is the TX power consumption of the transceiver for the narrowest bandwidth configuration for a single CC for the defined RAT (e.g., a baseline value), $P_{CP}$ is the power consumption of the transceiver control plane for a single component carrier, $\alpha_m$ is the scale factor based on CC bandwidth for RX, $\delta_m$ is the number of MIMO layers for that CC (e.g., 1, 2, 3, 4), $\beta_n$ is the scale factor in the look-up table based on CC bandwidth for the TX, $\gamma$ is the scale factor in the look-up table based on number of CC's for the call configuration.

As should be appreciated, due to the analog nature of the RFIC, much of the circuitry may not change power consumption with larger bandwidths (e.g., LNAs, mixers, phase-locked loops, amplifiers, etc.). However, other circuits may change power consumption with larger bandwidths (e.g., data converters, clock trees that have a variable clock rate based on bandwidth, etc.). These $\alpha$ and $\beta$ factors may be assumed to be greater than one, but not much greater than one. These values may be determined based on characterization measurement data for different BW configurations for a particular RAT and may be stored in a look-up table. One example of such a look-up table for LTE (with fictitious data for the purpose of illustration) is shown in the table below:

| LTE Carrier BW | $\alpha$ | $\beta$ |
|---|---|---|
| 1.4 | 1 | 1 |
| 3 | 1.05 | 1.08 |
| 5 | 1.1 | 1.11 |
| 10 | 1.12 | 1.17 |
| 15 | 1.2 | 1.3 |
| 20 | 1.25 | 1.32 |

A similar equation/look-up table may also be used for the baseband/SoC sub-system, determined based on measurements/characterization for the particular circuitry. When a call is configured, the "static" portions of the power consumption may be computed based on the number of component carriers for each RAT and the bandwidths of each carrier. This value may be calculated only once per call configuration.

Figure 2:
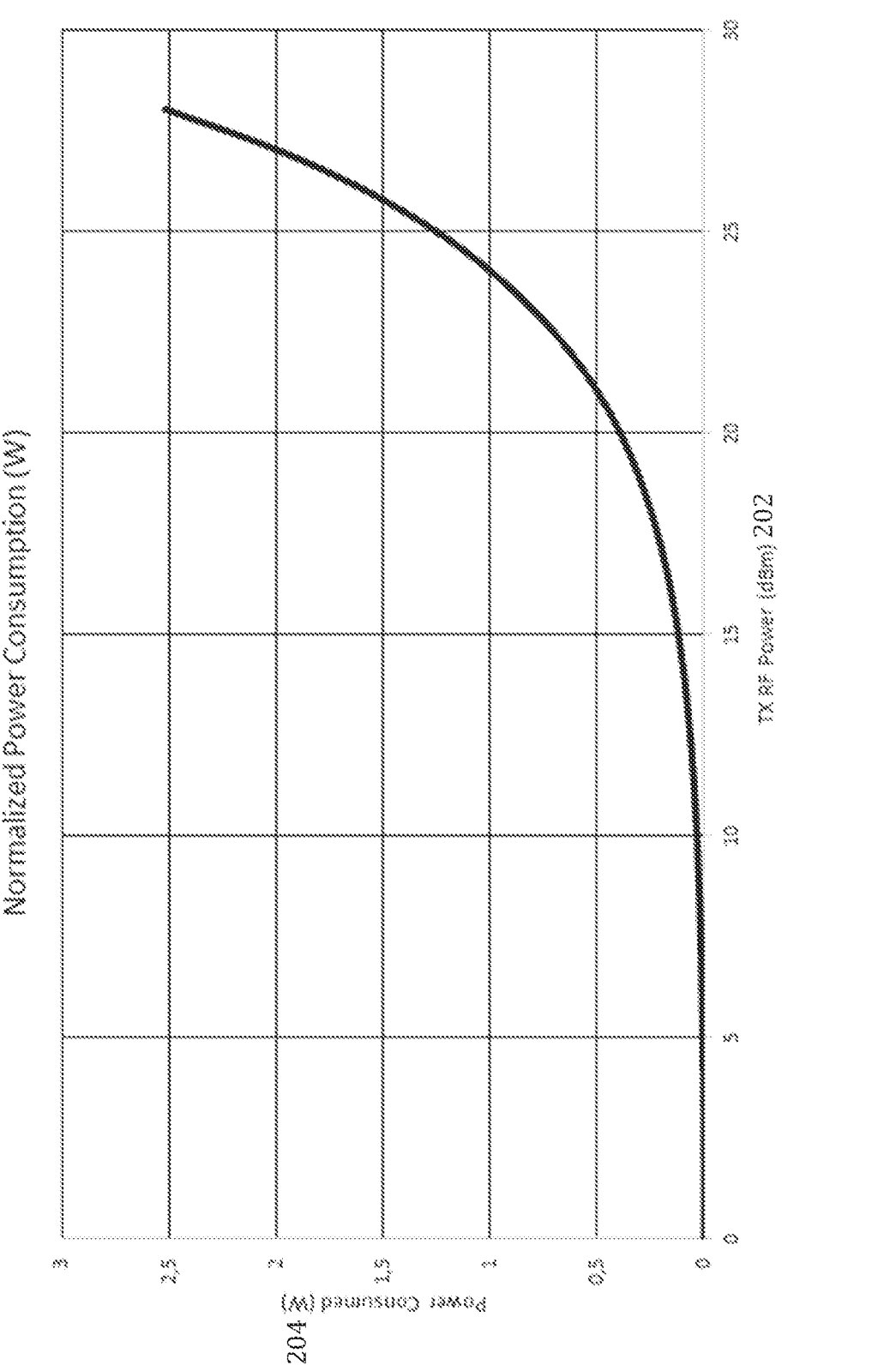
FIG. 2 shows an exemplary plot of power consumption versus radio frequency transmit power of a wireless wide area network modem.

As to the "dynamic" portion of estimating the power consumption, the power consumption of the PAs may be considered. As should be understood, power consumption in Watts may be exponentially related to RF power in dBm. FIG. 2 shows a normalized power consumption (in Watts) as a function of TX RF Power (in dBM). Otherwise stated, FIG. 2 shows a relationship between the Tx power 202 and the power consumed 204.

The PA power consumption may have a portion that is due to a quiescent power (e.g., related to the biasing network for the PAs, the envelope tracking (ET) modulator, etc.) and a portion that is due to generation of the necessary RF signal itself. RF power may vary quite substantially over time while operating in a live system with a changing RF environment (e.g., due to movement, fading, etc.). Often, power consumption reporting may occur at a much slower rate than the frequency of actual RF power fluctuations. Because of this, the power associated with the PA may be divided into large ranges, and the reported power may correspond to the power for the highest RF power in that range. In this way, headroom may be kept in the estimate to protect from consuming more than the requested RF signal power.

As an example, the following table and formula may be used:

| TX RF Power Range | P_pa_offset (W) |
|---|---|
| P_TX_RF < 10 dBm | 0 |
| 10 < P_TX_RF < RF_max_power | 2.4 |

$$P_{PA} = \sum_{x=1}^{X} P_{PA_x} + P_{pa\_offset_x}$$

In the above, X is the total number of active PAs in the system for a particular call configuration, $P_{PA_x}$ is the maximum power for the lowest defined TX RF power range in the look up table for the $x^{th}$ active PA (e.g., in this example case, using the table above, this power would correspond to the power consumption from the PA sub-system when transmitting at +10 dBm), and $P_{pa\_offset_x}$ is the value from the look-up table based on the current reported power level (e.g., if the current power level is <+10 dBm, this offset is 0 W; if the power level is >+10 dBm, the offset may be 2.1 W.

Using the algorithm described above, where the "static" and "dynamic" components of power consumption may be considered, the system may estimate a reasonable representation of the total modem power, accounting for current consumption differences associated with call configuration and associated with dynamic RF signal conditions. When implemented in the above-described manner, the number and complexity of look-up tables associated with $P_{max}$ estimations may be greatly reduced.

As should be appreciated, the above-described power estimation may be applicable to other wireless systems including sub-6 and mmW use cases, where different scalar values in the look-up tables may be used for mmW CCs as compared to those scalar values that would be used for sub-6 CCs.

The above formula may also be further subdivided to account for different classes or types of PAs. As an illustrative example, in a radio system in which mmW and sub-6 radio signaling is used, power profiles between the PAs may be differentiated. In this case:

$$P_{PA} = \sum_{x=1}^{X} P_{PA_x} + P_{pa\_offset_x} + \sum_{y=1}^{Y} P_{PA_y} + P_{pa\_offset_y}$$

In the above, $P_{PA_x}$ and $P_{pa\_offset_x}$ correspond to the sub-6 PAs and $P_{PA_y}$ and $P_{pa\_offset_y}$ correspond to the mmW PAs. In this way, accurate power estimates of PAs with different characteristics can be determined.

In short, the above-described algorithm for power estimation may provide accurate power prediction of a modem for its current use case in a real-time scenario. Further, the algorithm may be used as a power prediction model for any modem power key performance indicator (KPI) projections across different use cases (e.g., because it may capture all the relevant network dynamic configurations). Because the estimated power consumption is close to the actual power consumption, the host platform that may receive these estimated power values may accordingly allocate the estimated power budget to the modem while allocating the rest of the platform power budget to other sub-components, thereby improving the overall performance of the system.

In the case of a 5G module, which may require application in many different use cases (e.g., network slicing), the above-described solution may satisfy the increased need in 5G and later technologies for improved power consumption estimations. At the same time, it should be appreciated from the above description that this same concept may also be applied to any type of device such as Wi-Fi, Bluetooth, universal wide band (UWB), graphics devices, system-on-chip implementations, or any other feature platforms which may have dependencies on many different static and/or dynamic configurations and which may require a relatively fast (e.g., in real-time) power projections. For a given scenario, the contributions to power consumption may be categorized as static or dynamic variables, and then the power may be estimated more accurately to the particulars of the real-time situation.

FIG. 3 depicts a schematic flow diagram of an exemplary method 300 for estimating the power consumption of a wireless modem. Method 300 may implement any of the power estimation techniques described above.

Method 300 includes, in 310, determining a static power consumption estimate based on configuration parameters of modem subcomponents of a wireless modem. Method 300 also includes, in 320, determining a dynamic power consumption estimate based on a sum of, for each corresponding active power amplifier of the wireless modem, a predefined power offset associated with a current reported power level for the corresponding active power amplifier and a maximum transmit power of a predefined range associated with the current reported power level. Method 300 also includes, in 330, combining the static power consumption estimate and the dynamic power consumption estimate as a total estimate of the power consumption of the wireless modem. Further more, step 340 includes allocating a power budget to the modem based on the total estimate of the power consumption While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

Figure 4:
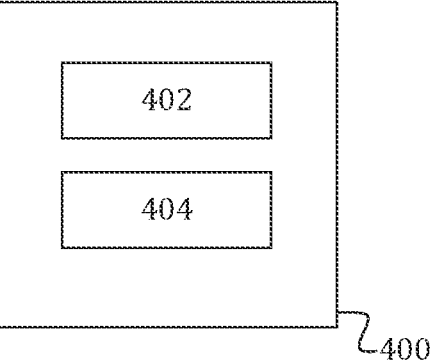
FIG. 4 shows a device, according to an aspect of the disclosure.

FIG. 4 depicts a device 400 comprising a processor 402 configured to determine a static power consumption estimate based on configuration parameters of modem subcomponents of a wireless modem 404; determine a dynamic power consumption estimate based on a sum of, for each corresponding active power amplifier of the wireless modem 404, a predefined power offset associated with a current reported power level for the corresponding active power amplifier and a maximum transmit power of a predefined range associated with the current reported power level; and combine the static power consumption estimate and the dynamic power consumption estimate as a total estimate of the power consumption of the wireless modem. The processor of the device may be further configured to control a maximum power supplied to the wireless modem based on the total estimate of the power consumption. The configuration parameters of the modem subcomponents may include at least one of a number of component carriers, a throughput, a number of multiple-input-multiple-output layers, a modulation order of the component carriers, a radio resource control (RRC) state, and a bandwidth for the component carriers for uplink transmissions and/or downlink transmissions. The modem subcomponents of the modem 404 may include at least one of: a baseband processor, a radio frequency integrated circuit (e.g., RFIC), a power management integrated circuit (e.g., PMIC), and a memory (e.g., DRAM).

Example 1 may include a device comprising a processor configured to: determine a static power consumption estimate based on configuration parameters of modem subcomponents of a wireless modem; determine a dynamic power consumption estimate based on a sum of, for each corresponding active power amplifier of the wireless modem, a predefined power offset associated with a current reported power level for the corresponding active power amplifier and a maximum transmit power of a predefined range associated with the current reported power level; and combine the static power consumption estimate and the dynamic power consumption estimate as a total estimate of the power consumption of the wireless modem.

Example 2 may include the device of example 1, wherein the processor is further configured to control a maximum power supplied to the wireless modem based on the total estimate of the power consumption.

Example 3 may include the device of either of examples 1 or 2, wherein the configuration parameters of the modem subcomponents comprise at least one of a number of component carriers, a throughput, a number of multiple-input-multiple-output layers, a modulation order of the component carriers, a radio resource control (RRC) state, and a bandwidth for the component carriers for uplink transmissions and/or downlink transmissions.

Example 4 may include the device of any one of examples 1 to 3, wherein the modem subcomponents comprise at least one of: a baseband processor, a radio frequency integrated circuit (e.g., RFIC), a power management integrated circuit (e.g., PMIC), and a memory (e.g., DRAM).

Example 5 may include the device of any one of examples 1 to 4, wherein the static power consumption estimate comprises a peak power requirement estimate for the modem subcomponents at a predefined time.

Example 6 may include the device of any one of examples 1 to 5, wherein the processor is further configured to determine the static power consumption estimate based on a lookup table of power consumption estimates, wherein each corresponding power consumption estimate of the lookup table is associated with a corresponding configurations parameter.

Example 7 may include the device of example 6, wherein the processor configured to determine the static power consumption estimate comprises the processor configured to select in the lookup table the corresponding power consumption estimate where the corresponding configuration parameters match a criterion based on the configuration parameters of the modem subcomponents.

Example 8 may include the device of example 7, wherein the criterion comprises a range of deviations from the corresponding configuration parameters within which the configuration parameters fall.

Example 9 may include the device of any one of examples 1 to 8, wherein the processor is further configured to determine the predefined power offset based on a lookup table of corresponding estimated predefined power offsets, each associated with a corresponding power level.

Example 10 may include the device of example 9, wherein the processor configured to determine the predefined power offset comprises the processor configured to select in the lookup table the corresponding estimated predefined power offset where the corresponding power level matches a criterion based on the current reported power level.

Example 11 may include the device of example 10, wherein the criterion comprises a range of deviations from the corresponding power level within which the current reported power level falls.

Example 12 may include the device of any one of examples 6 to 11, Example 12 may include the device further comprising a memory in communication with the processor and configured to store the lookup table(s).

Example 13 may include the device of any one of examples 1 to 12, Example 13 may include the device further comprising a memory in communication with the processor and configured to store at least one of the static power consumption estimate, the dynamic power consumption estimate, and the total power consumption estimate.

Example 14 may include a method for estimating power consumption of a wireless modem, the method comprising: determining a static power consumption estimate based on configuration parameters of modem subcomponents of the wireless modem; determining a dynamic power consumption estimate based on a sum of, for each corresponding active power amplifier of the wireless modem, a predefined power offset associated with a current reported power level for the corresponding active power amplifier and a maximum transmit power of a predefined range associated with the current reported power level; and combining the static power consumption estimate and the dynamic power consumption estimate as a total estimate of the power consumption of the wireless modem.

Example 15 may include a method of example 14, the method further comprising controlling a maximum power supplied to the wireless modem based on the total estimate of the power consumption.

Example 16 may include a method of either of examples 14 or 15, wherein the configuration parameters of the modem subcomponents comprise at least one of a number of component carriers, a throughput, a number of multiple-input-multiple-output layers, a modulation order of the component carriers, a radio resource control (RRC) state, and a bandwidth for the component carriers for uplink transmissions and/or downlink transmissions.

Example 17 may include a method of any one of examples 14 to 16, wherein the modem subcomponents comprise at least one of: a baseband processor, a radio frequency integrated circuit (e.g., RFIC), a power management integrated circuit (e.g., PMIC), and a memory (e.g., DRAM).

Example 18 may include a method of any one of examples 14 to 17, wherein the static power consumption estimate comprises a peak power requirement estimate for the modem subcomponents at a predefined time.

Example 19 may include a method of any one of examples 14 to 18, the method further comprising determining the static power consumption estimate based on a lookup table of power consumption estimates, wherein each corresponding power consumption estimate of the lookup table is associated with a corresponding configurations parameter.

Example 20 may include a method of example 19, wherein determining the static power consumption estimate comprises selecting in the lookup table the corresponding power consumption estimate where the corresponding configuration parameters match a criterion based on the configuration parameters of the modem subcomponents.

Example 21 may include a method of example 20, wherein the criterion comprises a range of deviations from the corresponding configuration parameters within which the configuration parameters fall.

Example 22 may include a method of any one of examples 14 to 21, the method further comprising determining the predefined power offset based on a lookup table of corresponding estimated predefined power offsets, each associated with a corresponding power level.

Example 23 may include a method of example 22, wherein determining the predefined power offset comprises selecting in the lookup table the corresponding estimated predefined power offset where the corresponding power level matches a criterion based on the current reported power level.

Example 24 may include a method of example 23, wherein the criterion comprises a range of deviations from the corresponding power level within which the current reported power level falls.

Example 25 may include a method of any one of examples 19 to 24, the method further comprising storing (e.g. in a memory) the lookup table(s).

Example 26 may include a method of any one of examples 14 to 25, the method further comprising storing (e.g., in a memory) at least one of the static power consumption estimate, the dynamic power consumption estimate, and the total power consumption estimate.

Example 27 may include an apparatus for estimating power consumption of a wireless modem, Example 27 may include the apparatus comprising: a means for determining a static power consumption estimate based on configuration parameters of modem subcomponents of the wireless modem; a means for determining a dynamic power consumption estimate based on a sum of, for each corresponding active power amplifier of the wireless modem, a predefined power offset associated with a current reported power level for the corresponding active power amplifier and a maximum transmit power of a predefined range associated with the current reported power level; and a means for combining the static power consumption estimate and the dynamic power consumption estimate as a total estimate of the power consumption of the wireless modem.

Example 28 may include the apparatus of example 27, Example 28 may include the apparatus further comprising a means for controlling a maximum power supplied to the wireless modem based on the total estimate of the power consumption.

Example 29 may include the apparatus of either of examples 27 or 28, wherein the configuration parameters of the modem subcomponents comprise at least one of a number of component carriers, a throughput, a number of multiple-input-multiple-output layers, a modulation order of the component carriers, a radio resource control (RRC) state, and a bandwidth for the component carriers for uplink transmissions and/or downlink transmissions.

Example 30 may include the apparatus of any one of examples 27 to 29, wherein the modem subcomponents comprise at least one of: a baseband processor, a radio frequency integrated circuit (e.g., RFIC), a power management integrated circuit (e.g., PMIC), and a memory (e.g., DRAM).

Example 31 may include the apparatus of any one of examples 27 to 30, wherein the static power consumption estimate comprises a peak power requirement estimate for the modem subcomponents at a predefined time.

Example 32 may include the apparatus of any one of examples 27 to 31, Example 32 may include the apparatus further comprising a means for determining the static power consumption estimate based on a lookup table of power consumption estimates, wherein each corresponding power consumption estimate of the lookup table is associated with a corresponding configurations parameter.

Example 33 may include the apparatus of example 32, wherein the means for determining the static power consumption estimate comprises a means for selecting in the lookup table the corresponding power consumption estimate where the corresponding configuration parameters match a criterion based on the configuration parameters of the modem subcomponents.

Example 34 may include the apparatus of example 33, wherein the criterion comprises a range of deviations from the corresponding configuration parameters within which the configuration parameters fall.

Example 35 may include the apparatus of any one of examples 27 to 34, Example 35 may include the apparatus further comprising a means for determining the predefined power offset based on a lookup table of corresponding estimated predefined power offsets, each associated with a corresponding power level.

Example 36 may include the apparatus of example 35, wherein the means for determining the predefined power offset comprises a means for selecting in the lookup table the corresponding estimated predefined power offset where the corresponding power level matches a criterion based on the current reported power level.

Example 37 may include the apparatus of example 36, wherein the criterion comprises a range of deviations from the corresponding power level within which the current reported power level falls.

Example 38 may include the apparatus of any one of examples 32 to 37, Example 38 may include the apparatus further comprising a means for storing (e.g. a memory) the lookup table(s).

Example 39 may include the apparatus of any one of examples 27 to 38, Example 39 may include the apparatus further comprising a means for storing (e.g., in a memory) at least one of the static power consumption estimate, the dynamic power consumption estimate, and the total power consumption estimate.

Example 40 may include a non-transitory computer readable medium that comprises instructions which, if executed, cause one or more processors to: determine a static power consumption estimate based on configuration parameters of modem subcomponents of a wireless modem; determine a dynamic power consumption estimate based on a sum of, for each corresponding active power amplifier of the wireless modem, a predefined power offset associated with a current reported power level for the corresponding active power amplifier and a maximum transmit power of a predefined range associated with the current reported power level; and combine the static power consumption estimate and the dynamic power consumption estimate as a total estimate of the power consumption of the wireless modem.

Example 41 may include the non-transitory computer readable medium of example 40, wherein the instruction are further configured to cause the one or more processors to control a maximum power supplied to the wireless modem based on the total estimate of the power consumption.

Example 42 may include the non-transitory computer readable medium of either of examples 40 or 41, wherein the configuration parameters of the modem subcomponents comprise at least one of a number of component carriers, a throughput, a number of multiple-input-multiple-output layers, a modulation order of the component carriers, a radio resource control (RRC) state, and a bandwidth for the component carriers for uplink transmissions and/or downlink transmissions.

Example 43 may include the non-transitory computer readable medium of any one of examples 40 to 42, wherein the modem subcomponents comprise at least one of: a baseband processor, a radio frequency integrated circuit (e.g., RFIC), a power management integrated circuit (e.g., PMIC), and a memory (e.g., DRAM).

Example 44 may include the non-transitory computer readable medium of any one of examples 40 to 43, wherein the static power consumption estimate comprises a peak power requirement estimate for the modem subcomponents at a predefined time.

Example 45 may include the non-transitory computer readable medium of any one of examples 40 to 44, wherein the instruction are further configured to cause the one or more processors to determine the static power consumption estimate based on a lookup table of power consumption estimates, wherein each corresponding power consumption estimate of the lookup table is associated with a corresponding configurations parameter.

Example 46 may include the non-transitory computer readable medium of example 45, wherein the instructions configured to cause the one or more processors to determine the static power consumption estimate comprises the instructions configured to cause the one or more processors to select in the lookup table the corresponding power consumption estimate where the corresponding configuration parameters match a criterion based on the configuration parameters of the modem subcomponents.

Example 47 may include the non-transitory computer readable medium of example 46, wherein the criterion comprises a range of deviations from the corresponding configuration parameters within which the configuration parameters fall.

Example 48 may include the non-transitory computer readable medium of any one of examples 40 to 47, wherein the wherein the instruction are further configured to cause the one or more processors to determine the predefined power offset based on a lookup table of corresponding estimated predefined power offsets, each associated with a corresponding power level.

Example 49 may include the non-transitory computer readable medium of example 48, wherein the instructions configured to cause the one or more processors to determine the predefined power offset comprises the instructions further configured to cause the one or more processors to select in the lookup table the corresponding estimated predefined power offset where the corresponding power level matches a criterion based on the current reported power level.

Example 50 may include the non-transitory computer readable medium of example 49, wherein the criterion comprises a range of deviations from the corresponding power level within which the current reported power level falls.

Example 51 may include the non-transitory computer readable medium of any one of examples 45 to 50, Example 51 may include the non-transitory computer readable medium further comprising a memory in communication with the one or more processors, wherein the instructions are further configured to cause the memory to store the lookup table(s).

Example 52 may include the non-transitory computer readable medium of any one of examples 40 to 51, Example 52 may include the non-transitory computer readable medium further comprising a memory in communication with the one or more processors, wherein the instructions are further configured to cause the memory to store at least one of the static power consumption estimate, the dynamic power consumption estimate, and the total power consumption estimate.

The invention claimed is:

1. A device comprising a processor configured to:
determine a static power consumption estimate based on configuration parameters of modem subcomponents of a wireless modem;

determine a dynamic power consumption estimate based on a sum of, for each corresponding active power amplifier of the wireless modem, a predefined power offset associated with a current reported power level for the corresponding active power amplifier and a maximum transmit power of a predefined range associated with the current reported power level;
combine the static power consumption estimate and the dynamic power consumption estimate as a total estimate of the power consumption of the wireless modem; and
allocate a power budget to the modem based on the total estimate of the power consumption;
wherein the static power consumption estimate comprises a peak power requirement estimate for the modem subcomponents at a predefined time.

2. The device of claim 1, wherein the processor is further configured to control a maximum power supplied to the wireless modem based on the allocated power budget.

3. The device of claim 1, wherein the configuration parameters of the modem subcomponents comprise at least one of a number of component carriers, a throughput, a number of multiple-input-multiple-output layers, a modulation order of the component carriers, a radio resource control (RRC) state, and a bandwidth for the component carriers for uplink transmissions and/or downlink transmissions.

4. The device of claim 1, wherein the modem subcomponents comprise at least one of: a baseband processor, a radio frequency integrated circuit (e.g., RFIC), a power management integrated circuit (e.g., PMIC), and a memory (e.g., DRAM).

5. The device of claim 1, wherein the processor is further configured to determine the static power consumption estimate based on a lookup table of power consumption estimates, wherein each corresponding power consumption estimate of the lookup table is associated with a corresponding configurations parameter.

6. The device of claim 5, wherein the processor configured to determine the static power consumption estimate comprises the processor configured to select in the lookup table the corresponding power consumption estimate where the corresponding configuration parameters match a criterion based on the configuration parameters of the modem subcomponents.

7. The device of claim 6, wherein the criterion comprises a range of deviations from the corresponding configuration parameters within which the configuration parameters fall.

8. The device of claim 1, wherein the processor is further configured to determine the predefined power offset based on a lookup table of corresponding estimated predefined power offsets, each associated with a corresponding power level.

9. The device of claim 8, wherein the processor configured to determine the predefined power offset comprises the processor configured to select in the lookup table the corresponding estimated predefined power offset where the corresponding power level matches a criterion based on the current reported power level.

10. A method for estimating power consumption of a wireless modem, the method comprising:
determining a static power consumption estimate based on configuration parameters of modem subcomponents of the wireless modem;
determining a dynamic power consumption estimate based on a sum of, for each corresponding active power amplifier of the wireless modem, a predefined power offset associated with a current reported power level for the corresponding active power amplifier and a maximum transmit power of a predefined range associated with the current reported power level; and combining the static power consumption estimate and the dynamic power consumption estimate as a total estimate of the power consumption of the wireless modem;

wherein the static power consumption estimate comprises a peak power requirement estimate for the modem subcomponents at a predefined time.

11. The method of claim 10, the method further comprising controlling a maximum power supplied to the wireless modem based on the total estimate of the power consumption.

12. The method of claim 10, wherein the configuration parameters of the modem subcomponents comprise at least one of a number of component carriers, a throughput, a number of multiple-input-multiple-output layers, a modulation order of the component carriers, a radio resource control (RRC) state, and a bandwidth for the component carriers for uplink transmissions and/or downlink transmissions.

13. The method of claim 10, wherein the modem subcomponents comprise at least one of: a baseband processor, a radio frequency integrated circuit (e.g., RFIC), a power management integrated circuit (e.g., PMIC), and a memory (e.g., DRAM).

14. The method of claim 10, the method further comprising determining the static power consumption estimate based on a lookup table of power consumption estimates, wherein each corresponding power consumption estimate of the lookup table is associated with a corresponding configurations parameter.

15. The method of claim 14, wherein determining the static power consumption estimate comprises selecting in the lookup table the corresponding power consumption estimate where the corresponding configuration parameters match a criterion based on the configuration parameters of the modem subcomponents.

16. The method of claim 15, wherein the criterion comprises a range of deviations from the corresponding configuration parameters within which the configuration parameters fall.

17. The method of claim 10, the method further comprising determining the predefined power offset based on a lookup table of corresponding estimated predefined power offsets, each associated with a corresponding power level.

18. The method of claim 17, wherein determining the predefined power offset comprises selecting in the lookup table the corresponding estimated predefined power offset where the corresponding power level matches a criterion based on the current reported power level.

19. A device comprising a processor configured to:

determine a static power consumption estimate based on configuration parameters of modem subcomponents of a wireless modem;

determine a dynamic power consumption estimate based on a sum of, for each corresponding active power amplifier of the wireless modem, a predefined power offset associated with a current reported power level for the corresponding active power amplifier and a maximum transmit power of a predefined range associated with the current reported power level;

combine the static power consumption estimate and the dynamic power consumption estimate as a total estimate of the power consumption of the wireless modem; and allocate a power budget to the modem based on the total estimate of the power consumption;

wherein the processor is further configured to determine the static power consumption estimate based on a lookup table of power consumption estimates, wherein each corresponding power consumption estimate of the lookup table is associated with a corresponding configurations parameter, or wherein the processor is further configured to determine the predefined power offset based on a lookup table of corresponding estimated predefined power offsets, each associated with a corresponding power level.

* * * * *